United States Patent
Kang et al.

(10) Patent No.: US 8,982,274 B2
(45) Date of Patent: Mar. 17, 2015

(54) CAMERA MODULE INCLUDING HANDSHAKING CORRECTING DEVICE

(75) Inventors: Byung Woo Kang, Gyunggi-do (KR); Soo Cheol Lim, Gyunggi-do (KR); Sang Min On, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 57 days.

(21) Appl. No.: 13/572,755

(22) Filed: Aug. 13, 2012

(65) Prior Publication Data

US 2013/0162896 A1 Jun. 27, 2013

(30) Foreign Application Priority Data

Dec. 23, 2011 (KR) .................. 10-2011-0141315

(51) Int. Cl.
*H04N 5/225* (2006.01)

(52) U.S. Cl.
USPC .......................................................... 348/374

(58) Field of Classification Search
USPC ............................................ 348/374, 208.11
See application file for complete search history.

(56) References Cited

U.S. PATENT DOCUMENTS

| | | | | |
|---|---|---|---|---|
| 2006/0170814 A1* | 8/2006 | Tsai | ............................... | 348/357 |
| 2009/0295986 A1* | 12/2009 | Topliss et al. | .................. | 348/374 |
| 2011/0030368 A1* | 2/2011 | Kume | ............................... | 60/527 |
| 2011/0063741 A1* | 3/2011 | Park et al. | ...................... | 359/823 |
| 2011/0091193 A1* | 4/2011 | Lim et al. | ....................... | 396/133 |
| 2011/0096421 A1* | 4/2011 | Hirata et al. | .................... | 359/823 |
| 2011/0102920 A1* | 5/2011 | Shyu et al. | ...................... | 359/823 |
| 2012/0019675 A1* | 1/2012 | Brown | ........................ | 348/208.2 |

FOREIGN PATENT DOCUMENTS

| | | |
|---|---|---|
| CN | 101416090 | 4/2009 |
| CN | 102023364 | 4/2011 |
| KR | 10-2011-0028049 | 3/2011 |
| KR | 10-1044219 | 6/2011 |
| WO | 2007/113478 | 10/2007 |

OTHER PUBLICATIONS

Office Action dated Feb. 7, 2013 for related Korean Patent Application No. 10-2011-0141315 and its English summary provided by the clients.
Office Action dated Sep. 1, 2014 for Chinese Patent Application No. 201210202294.7 and its English summary provided by Applicant's foreign counsel.

* cited by examiner

*Primary Examiner* — Kelly L Jerabek
*Assistant Examiner* — Abdelaaziz Tissire
(74) *Attorney, Agent, or Firm* — Ladas & Parry, LLP

(57) ABSTRACT

Disclosed herein is a camera module, including: a lens holder including a receiving unit receiving a lens module therein; a driving unit joined to the lens holder to be movable in a direction vertical to an optical-axis direction; a housing in which the driving unit is installed to be movable in the vertical direction to the optical-axis direction and having a protruding member that protrudes on one surface thereof; a shape memory alloy wire part connected to the driving unit to generate driving force in the vertical direction to the optical-axis direction; and an elastic member applying a preload to the shape memory alloy wire part to cause initial transformation.

13 Claims, 6 Drawing Sheets

CAMERA MODULE INCLUDING HANDSHAKING CORRECTING DEVICE

CROSS REFERENCE TO RELATED APPLICATION

This application claims the benefit of Korean Patent Application No. 10-2011-0141315, filed on Dec. 23, 2011, entitled "Camera Module", which is hereby incorporated by reference in its entirety into this application.

BACKGROUND OF THE INVENTION

1. Technical Field

The present invention relates to a camera module.

2. Description of the Related Art

As existing camera functions are adopted in cellular phones, optical components such as a lens, a lens actuator, an image sensor, and the like have been gradually miniaturized and additional functions such as automatic focusing, zooming, hand shaking correction, and the like from a camera module having a fixed focus function have been gradually luxuriated.

In general, while a user photographs a subject, blurring occurs due to user's hand shaking, and as a result, a clear image cannot be obtained.

Therefore, a lens moving type configured to correct hand shaking by fixing the image sensor constituting the camera module and moving the lens in a vertical direction to an optical axis and as an opposite type, a sensor moving type configured to fix the lens and moving the image sensor in the vertical direction to the optical axis have been used in order to correct the user's hand shaking.

However, when a hand shaking correcting function is added to a camera module for a mobile apparatus which is miniaturized and slimmed, a voice coil motor (VCM) which is generally used is used as the lens actuator for implementing the hand shaking correction and the size thereof is increased by other driving actuators.

SUMMARY OF THE INVENTION

The present invention has been made in an effort to provide a camera module including a hand shaking correcting device which can be miniaturized.

According to a preferred embodiment of the present invention, there is provided a camera module including: a lens holder including a receiving unit receiving a lens module therein; a driving unit joined to the lens holder to be movable in a direction vertical to an optical-axis direction; a housing in which the driving unit is installed to be movable in the vertical direction to the optical-axis direction and having a protruding member that protrudes on one surface thereof; a shape memory alloy wire part connected to the driving unit to generate driving force in the vertical direction to the optical-axis direction; and an elastic member applying a preload to the shape memory alloy wire part to cause initial transformation.

The lens holder may include: a receiving unit receiving a lens therein; and a top plate unit having fixing protrusions that protrude on the top and one surface and having a guide groove formed on the bottom thereof.

The driving unit may include: a driving stage receiving the lens holder therein; a first ball placed between the lens holder and the driving stage to slidably drive the driving stage in the vertical direction to the optical-axis direction; and a second ball placed between the driving stage and the housing to slidably drive the driving stage in the other direction vertical to the optical-axis direction, and the first ball and the second ball may be placed vertical to each other.

The driving stage may include: a fixing protrusion protruding along an outer peripheral surface; a support bar protruding toward an image sensor from the bottom; an upper guide groove formed on an upper periphery to receive the first ball to be driven; and a lower guide groove formed on a lower periphery to receive the second ball to be driven, and the upper guide groove may be formed on the same plane as one direction vertical to the optical-axis direction and the lower guide groove may be formed on the same plane as the other direction vertical to the optical-axis direction.

The housing may further include a guide groove formed on an upper peripheral surface, and the fixing protrusion may protrude on a side surface adjacent to the top where the guide groove is formed.

The shape memory alloy wire part may include: a first shape memory alloy wire part connected to one side of the driving unit to generate driving force in the vertical direction to the optical-axis direction; and a second shape memory alloy wire part connected to the other side of the driving unit to generate driving force in the other direction vertical to the optical-axis direction, and the driving unit may slidably move in two directions vertical to the optical-axis direction by the driving force of the first shape memory alloy wire part and the second shape memory alloy wire part.

The first shape memory alloy wire part may include: wire holders fixedly joined to the top of the driving unit and positioned to be spaced apart from each other by a predetermined gap; and a first shape memory alloy wire of which one end is fixed to one wire holder and the other end is fixed to the other wire holder and extending over the top of the lens holder.

The second shape memory alloy wire part may include: wire holders fixedly joined to an inner surface of the housing and positioned to be spaced apart from each other by a predetermined gap; and a second shape memory alloy wire of which one end is fixed to one wire holder and the other end is fixed to the other wire holder and extending over the bottom of the driving unit.

The elastic member may include: a first elastic member of which one end is fixed to one surface of the top plate unit of the lens holder and the other end is fixed to one surface of the driving unit; and a second elastic member of which one end is fixed to one surface of the housing and the other end is fixed to the other surface of the driving unit.

The first elastic member may apply a preload to the driving unit in the vertical direction to the optical-axis direction to apply the preload to the shape memory alloy wire part.

The second elastic member may apply a preload to the driving unit in the other direction vertical to the optical-axis direction to apply the preload to the shape memory alloy wire part.

The first elastic member and the second elastic member may be configured by any one of a tensile spring or a compression spring.

The camera module may further include: a case with an opening for exposing the lens module; an image sensor joined to the bottom of the housing and converting an image imaged by the lens into an electric signal; a printed circuit board that has the image sensor mounted on the top thereof and on which a lower periphery of the housing is seated; an infrared cut-off filter positioned on the top of the image sensor in order to filter infrared rays that are inputted into the image sensor; and a position sensor sensing positional changes of the lens holder and the driving unit.

The position sensor may be installed on an outer peripheral surface of any one of the lens holder, the driving unit, and the housing and configured by any one of a photo interrupter sensor, a photo reflector sensor, a hall effect sensor, and a magnetic sensor.

DESCRIPTION OF THE PREFERRED EMBODIMENTS

Figure 1:
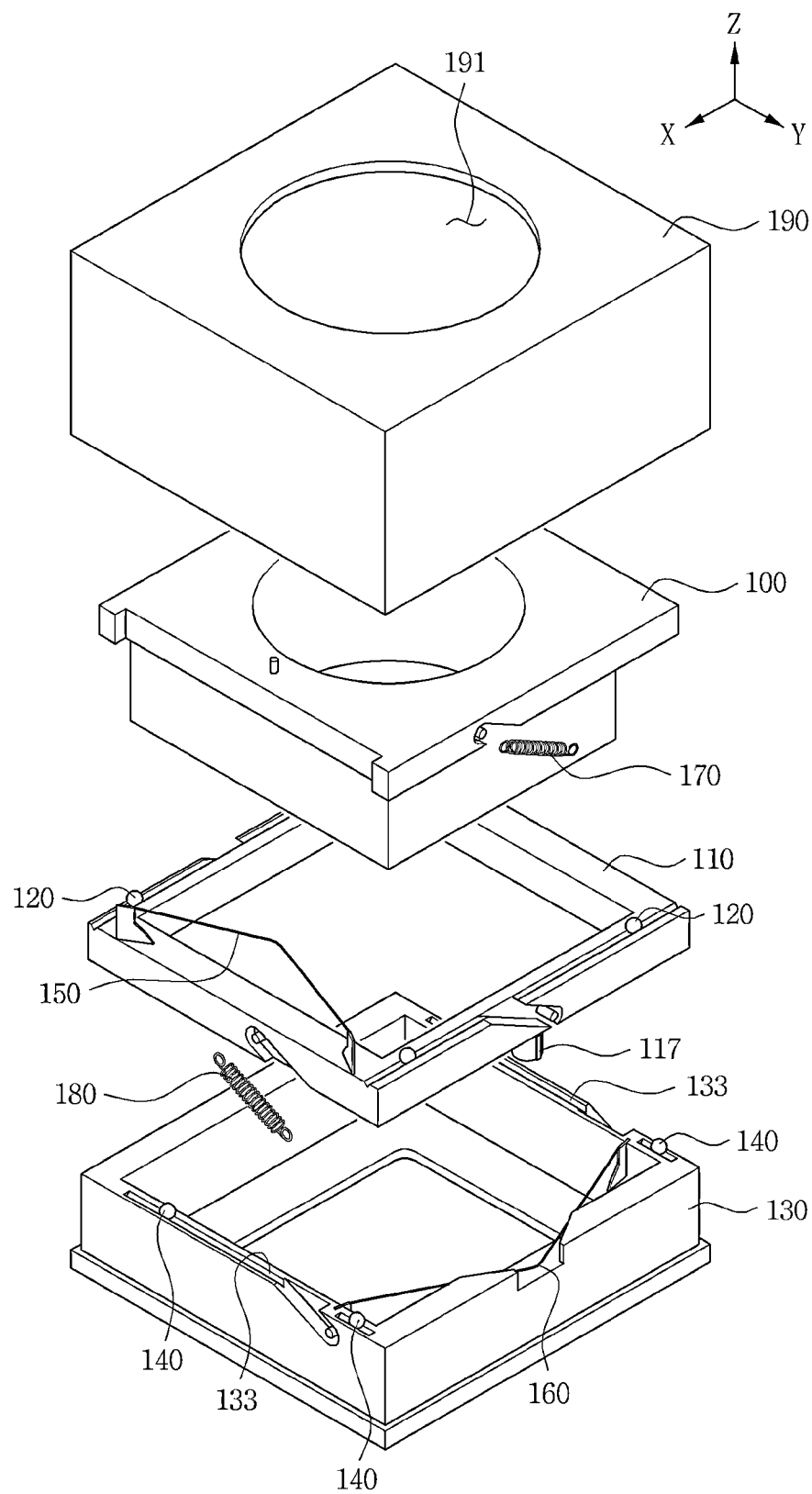
FIG. 1 is an exploded perspective view of a camera module including a hand shaking correcting device according to a preferred embodiment of the present invention.

The above and other objects, features, and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings.

Further, when it is determined that the detailed description of the known art related to the present invention may obscure the gist of the present invention, the detailed description thereof will be omitted. While terms such as "first," "second," etc., may be used to describe various components, such terms are used only to distinguish one component from another, and the components must not be limited to the above terms.

Hereinafter, preferred embodiments of the present invention will now be described with reference to the attached drawings.

Figure 2:
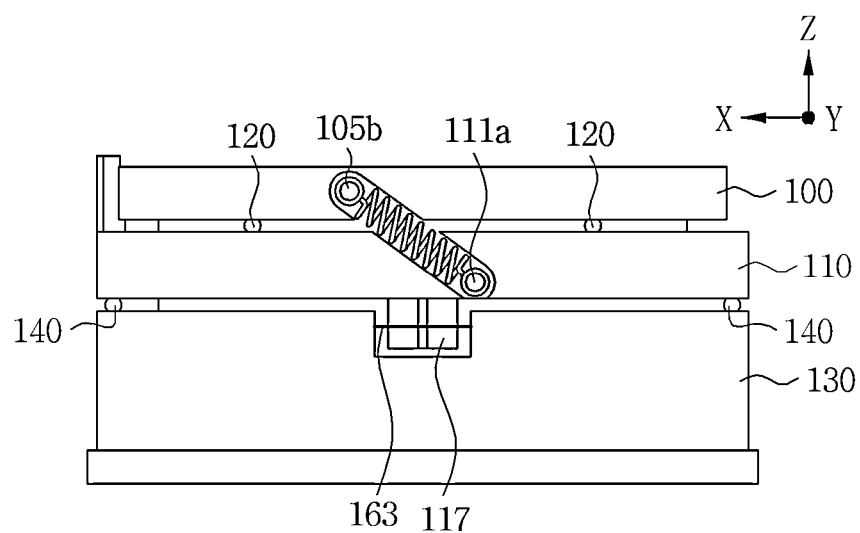
FIG. 2 is a side view of the camera module shown in FIG. 1.
Figure 3:
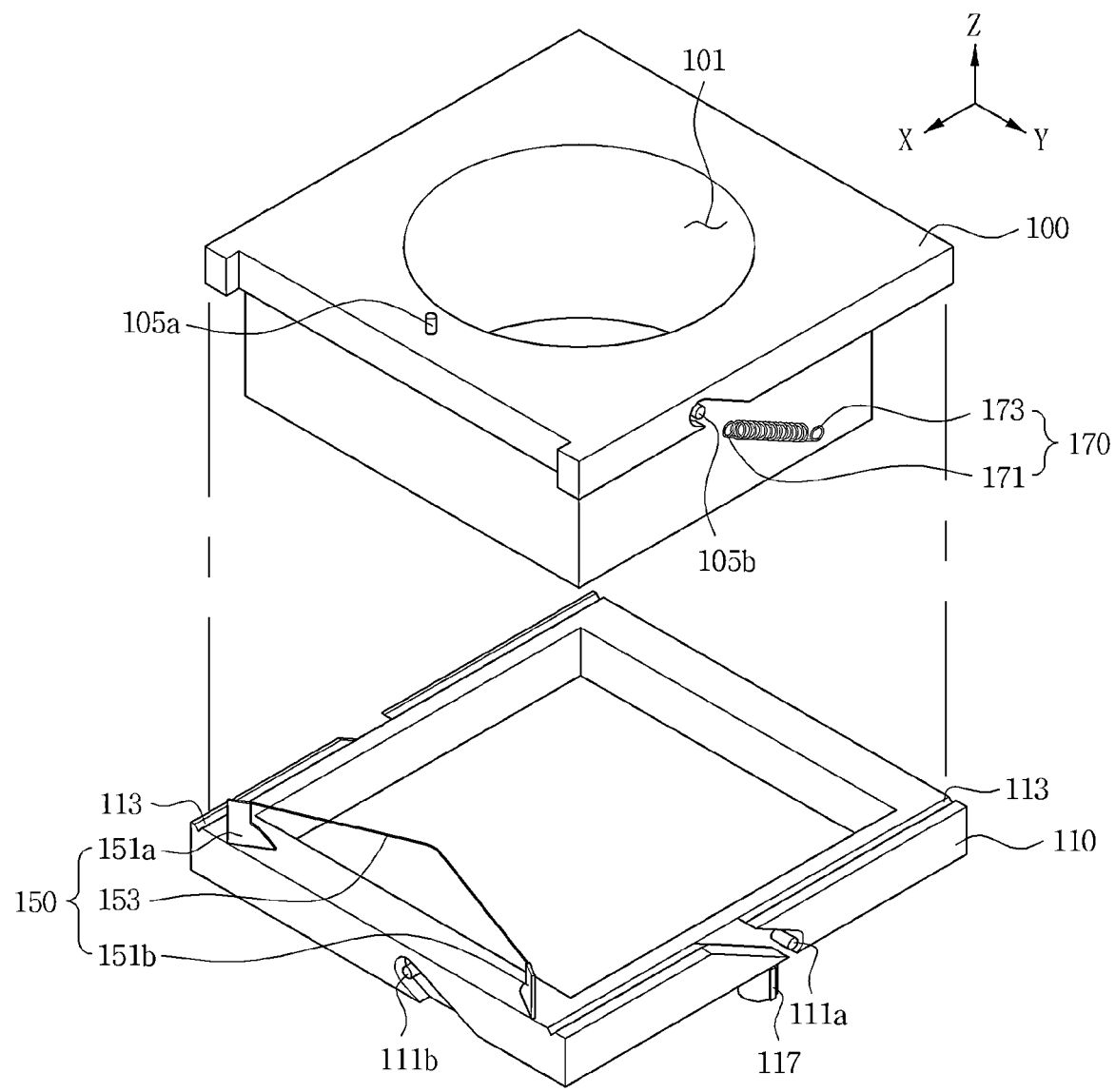
FIG. 3 is an exploded perspective view showing a joining relationship between a lens holder and a driving unit shown in FIG. 1.
Figure 4:
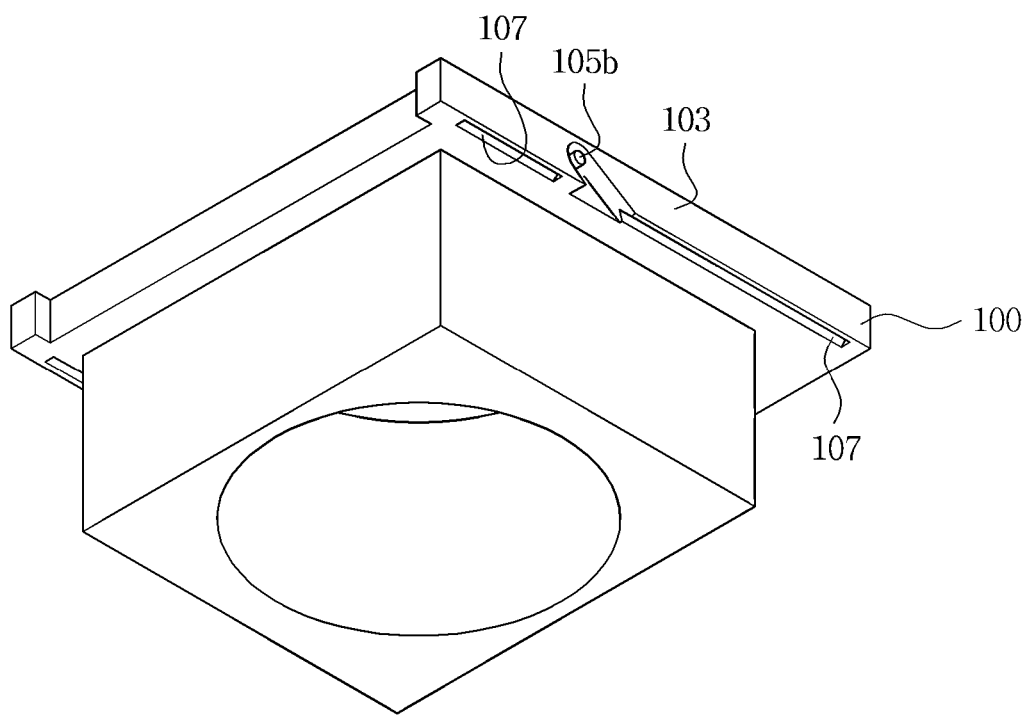
FIG. 4 is a perspective view showing a lower part of the lens holder shown in FIG. 1.
Figure 5:
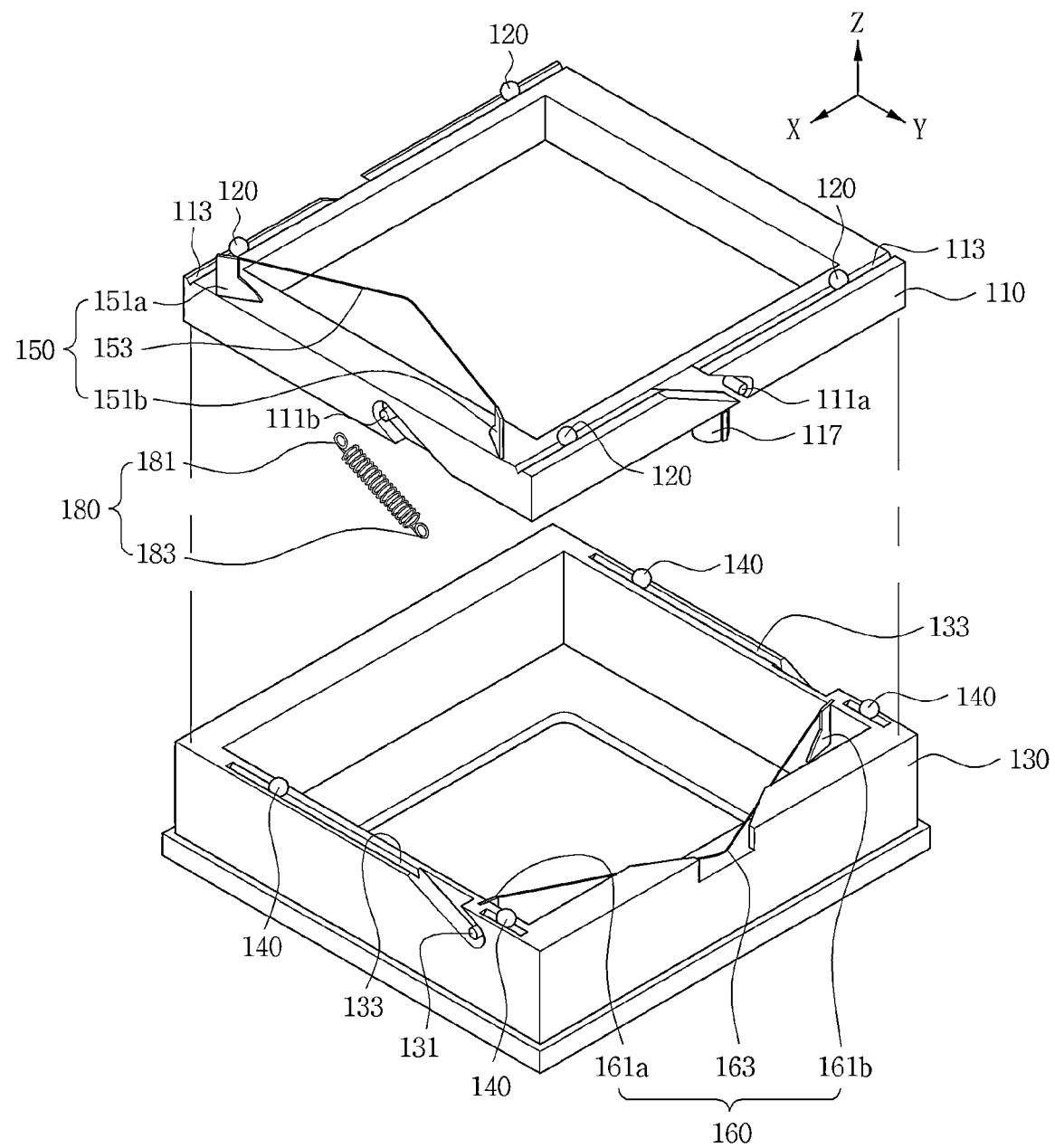
FIG. 5 is an exploded perspective view showing a joining relationship between the driving unit and a housing shown in FIG. 1.
Figure 6:
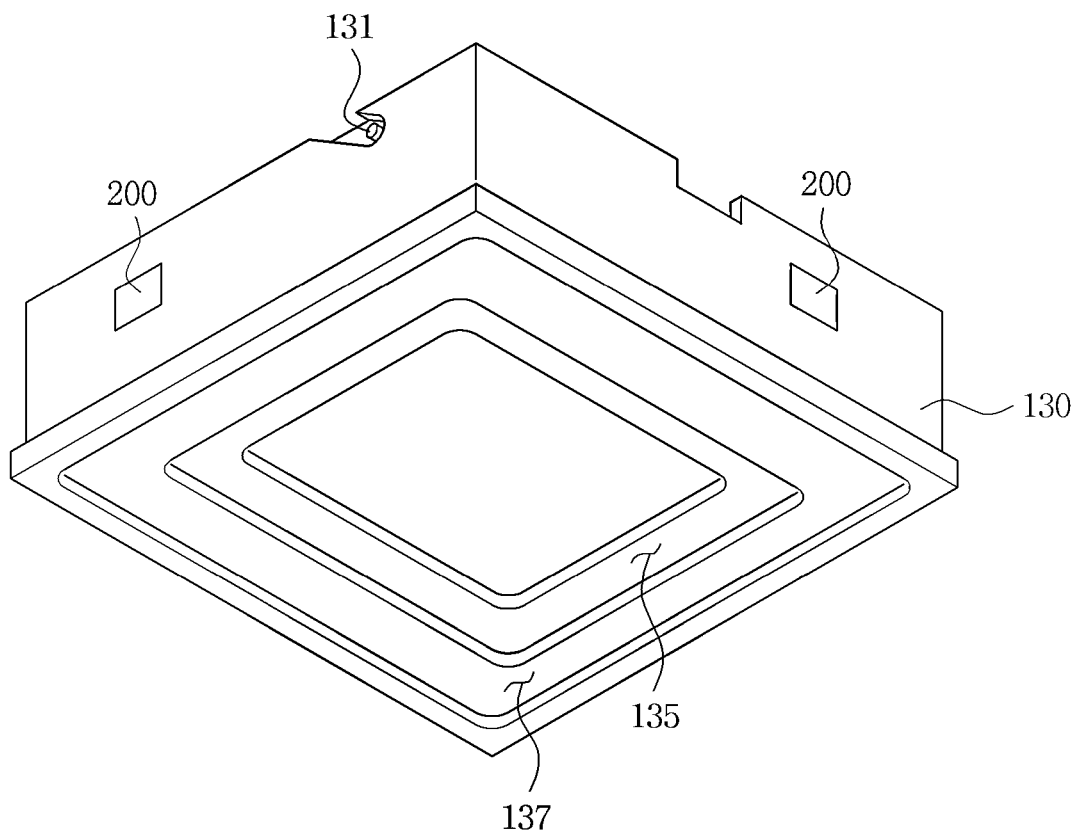
FIG. 6 is a perspective view showing a lower part of the housing shown in FIG. 1.

FIG. 1 is an exploded perspective view of a camera module including a hand shaking correcting device according to a preferred embodiment of the present invention. FIG. 2 is a side view of the camera module. FIG. 3 is an exploded perspective view showing a joining relationship between a lens holder and a driving unit. FIG. 4 is a perspective view showing a lower part of the lens holder. FIG. 5 is an exploded perspective view showing a joining relationship between the driving unit and a housing. FIG. 6 is a perspective view showing a lower part of the housing.

As shown in the figures, the camera module includes a lens holder 100, a driving unit, a housing 130, a shape memory alloy wire part, an elastic member, and a case 190.

The lens holder 100 has a receiving unit 101 receiving a lens module which is movable in an optical-axis direction (a Z-axis direction of a coordinate axis) for imaging an imaging target object therein and a top plate unit 103 on the top.

A fixing protrusion 105a which is oriented in the optical-axis direction protrudes on the top of the top plate unit 103.

In addition, a fixing protrusion 105b that receives a first elastic member 170 to be described below and to which one end of the first elastic member 170 is fixedly joined is formed on one surface of the top plate unit 103.

Further, as shown in FIG. 4, a guide groove 107 is formed on the bottom of the top plate unit 103 so that a first ball 120 to be described below is movable in an X-axis direction based on a coordinate axis shown in FIG. 1.

The driving unit is minutely driven in an X-axis direction or Y-axis direction based on the coordinate axis shown in FIG. 1 in order to correct user's hand shaking according to the preferred embodiment of the present invention shown in FIGS. 4 and 5.

More specifically, the driving unit includes a driving stage 110, a first ball 120, and a second ball 140.

The top plate unit 103 of the lens holder 100 is placed above the driving stage 110 so that the lens holder 100 is received in the driving stage 110.

Further, the driving stage 110 includes fixing protrusion 111a and 111b, an upper guide groove 113, and a lower guide groove.

The fixing protrusion 111a protrudes along an outer peripheral surface of the driving stage 110 to be positioned in an oblique-line direction to a fixing protrusion 105b of the lens holder 100.

Further, the fixing protrusion 111b protrudes along the outer peripheral surface of the driving stage 110 to be positioned in an oblique-line direction to a protruding member 131 formed on one surface of the housing 130 to be described below.

In addition, the upper guide groove 113 is formed on an upper periphery of the driving stage 110 to be opposite to the guide groove 107 formed on the bottom of the top plate unit 103.

That is, the guide groove 113 is preferably formed on the upper periphery of the driving stage 110 positioned on the same plane as the X-axis direction which is one direction vertical to a Z-axis direction as the optical-axis direction.

As a result, the first ball 120 is received in the guide groove 107 of the top plate unit 103 and the upper guide groove 113 of the driving stage 110 to slidably move the driving stage 110 in the X-axis direction.

Further, the lower guide groove, which is used to receive the second ball 140 to slidingly move the driving stage 110 in the Y-axis direction which is the other direction vertical to the Z-axis direction as the optical-axis direction, is formed on the lower periphery of the driving stage 110.

In addition, the driving stage 110 includes a support bar 117 that protrudes toward the image sensor from a lower part in which the lower guide groove is formed.

The first ball 120 is placed between the guide groove 107 formed on the bottom of the top plate unit 103 and the upper guide groove 113 of the driving stage 110 to slidably move the driving stage 110 in the X-axis direction which is the direction vertical to the Z-axis direction as the optical-axis direction as shown and described in FIG. 5.

Further, a rubber ring that can prevent the first ball 120 from being deviated may be installed around the guide groove 107 of the top plate unit 103 or the upper guide groove 113 of the driving stage 110 in which the first ball 120 is placed.

The housing 130 is installed below the driving stage 110 and includes the protruding member 131 and the guide groove 133 as shown in FIGS. 5 and 6.

More specifically, the protruding member 131 protrudes on one surface of the housing 130 to be positioned in an oblique-line direction to the fixing protrusion 111b of the driving stage 110.

In addition, the guide groove 133 is formed on the top of the housing 130 to be opposed to the lower guide groove to receive the second ball 140 to be described below to be driven in the Y-axis direction.

Further, as shown in FIG. 6 showing the bottom of the housing 130, an cut-off filter receiving groove 135 to which an infrared cut-off filter will be joined and a printed circuit board receiving groove 137 to which a printed circuit board mounted with the image sensor will be joined are formed on the bottom surface of the housing 130.

The second ball 140 is placed between the lower guide groove of the driving stage 110 and the guide groove 133 of the housing 130 to slidably move the driving stage 110 in the Z-axis direction as the optical axis and the Y-axis direction which is the direction vertical to the X-axis direction, which is driven by the first ball 120.

Further, the rubber ring that can prevent the second ball 140 from being deviated may be installed around the lower guide groove of the driving stage 110 or on the guide groove 133 of the housing 130 in which the second ball 140 is placed.

The shape memory alloy wire part is connected to the driving unit to generate driving force in two directions vertical to the optical-axis direction and includes a first shape memory alloy wire part 150 generating the driving force in the direction vertical to the optical-axis direction and a second shape memory alloy wire part 160 generating the driving force in the other direction vertical to the optical-axis direction.

More specifically, the first shape memory alloy wire part 150 generates driving force to move the driving stage 110 in the X-axis direction.

In addition, the second shape memory alloy wire part 160 generates driving force to move the driving stage 110 in the Y-axis direction.

As a result, the driving unit slidably moves in two directions (X and Y-axis directions) vertical to the optical-axis direction by the driving force of the first shape to memory alloy wire part 150 and the second shape memory alloy wire part 160.

The first shape memory alloy wire part 150 includes wire holders 151a and 151b and a first shape memory alloy wire 153 as shown in FIGS. 3 and 5.

The wire holders 151a and 151b are spaced apart from each other by a predetermined gap to be fixedly joined to the top of the driving stage 110.

Further, one end of the first shape memory alloy wire 153 is fixed to the wire holder 151a and the other end of the first shape memory alloy wire 153 is fixed to the wire holder 151b, and as a result, the first shape memory alloy wire 153 extends over the fixing protrusion 105a of the lens holder 100.

In addition, the length of the first shape memory alloy wire 153 is changed by a preload generated by the first elastic member 170 to be described below and if current is applied to the first shape memory alloy wire 153 to generate heat, the length of the first shape memory alloy wire 153 is restored to an initial length.

As a result, the driving stage 110 constituting the driving unit is moved in the X-axis direction by controlling tension generated by the preload of the first elastic member 170 and tension generated by the first shape memory alloy wire 153, thereby correcting an X-axis direction error caused due to the user's hand shaking.

The second shape memory alloy wire part 160 includes wire holders 161a and 161b and a second shape memory alloy wire 163 as shown in FIG. 5.

The wire holders 161a and 161b are spaced apart from each other at a predetermined gap to be fixedly joined to an inner surface of the housing 130.

Further, one end of the second shape memory alloy wire 163 is fixed to the wire holder 161a and the other end of the second shape memory alloy wire 163 is fixed to the wire holder 161b, and the second shape memory alloy wire 163 extends over the support bar 117 that protrudes on the bottom of the driving stage 110.

In addition, the length of the second shape memory alloy wire 163 is changed by a preload generated by the second elastic member 180 to be described below and if current is applied to the second shape memory alloy wire 163 to generate heat, the length of the second shape memory alloy wire 163 is restored to an initial length.

As a result, the driving stage 100 constituting the driving unit is moved in the Y-axis direction by controlling tension generated by the preload of the second elastic member 180 and tension generated by the second shape memory alloy wire 163, thereby correcting a Y-axis direction error caused due to the user's hand shaking.

Therefore, according to the preferred embodiment of the present invention, the first shape memory alloy wire part 150 constituting the camera module separately moves the driving stage 110 of the driving unit in the X-axis direction and the second shape memory alloy wire part 160 separately moves the driving stage 110 of the driving unit in the Y-axis direction.

Further, due to displacement interference between the first shape memory alloy wire part 150 and the second shape memory alloy wire part 160 and because rotation does not occur in the X-axis direction and the Y-axis direction vertical to the optical-axis direction (Z-axis direction), accurate correction of the hand shaking is provided.

The elastic member applies the preload to the shape memory alloy wire part to cause initial transformation and includes the first elastic member 170 and the second elastic member 180.

One end 171 of the first elastic member 170 is fixed to the fixing protrusion 105b formed on one surface of the top plate unit 103 of the lens holder 100 and the other end 173 is fixed to the fixing protrusion 111a formed on one surface of the driving stage 110, as shown in FIGS. 2 and 3.

In addition, the first elastic member 170 may be configured by any one of a tensile spring and a compression spring and according to the preferred embodiment of the present invention, the first elastic member 170 preferably has a tensile spring shape as shown in FIG. 2.

Therefore, the preload is applied to the lens holder 100 and the driving stage 110 in the X-axis direction, more specifically, toward the driving stage 110 by the first elastic member 170, and as a result, initial tension is applied to the first shape memory alloy wire 153 constituting the first shape memory alloy wire part 150.

Further, the first elastic member 170 prevents the first ball 120 positioned between the lens holder 100 and the driving stage 110 from being deviated due to external shock by the preload applied to the lens holder 100 and the driving stage 110.

On end 181 of the second elastic member 180 is fixed to the protruding member 131 of the housing 130 and the other end 183 is fixed to the fixing protrusion 111b formed on the other surface of the driving stage 110, as shown in FIG. 5.

In addition, the second elastic member 180 may be configured by any one of the tensile spring and the compression spring and according to the preferred embodiment of the present invention, the second elastic member 180 preferably has the tensile spring shape as shown in FIG. 5.

Therefore, the preload is applied to the driving stage 110 and the housing 130 in the Y-axis direction, more specifically, toward the housing 130 by the second elastic member 180, and as a result, initial tension is applied to the second shape memory alloy wire 163 constituting the second shape memory alloy wire part 160.

Further, the second elastic member 180 prevents the second ball 140 positioned between the driving stage 110 and the housing 130 from being deviated due to external shock by the preload applied to the driving stage 110 and the housing 130.

In addition, the camera module according to the preferred embodiment of the present invention may further include a position sensor 200.

More specifically, the position sensor 200 is used to measure a position variation of the camera lens which is moved in the X-axis direction and the Y-axis direction by the first shape memory alloy wire part 150 and the second shape memory alloy wire part 160 and may be selectively in any one of the lens holder 100, the driving stage 110, and the housing 130.

As a result, as shown in FIG. 6 according to the preferred embodiment of the present invention, the position sensor 200 is joined the outer peripheral surface of the housing 130 to detect variations in the X and Y-axis directions.

Further, the position sensor 200 may be configured by any one of a photo interrupter sensor, a photo reflector sensor, a hall effect sensor, and a magnetic sensor.

As set forth above, according to a preferred embodiment of the present invention, blurring caused by user's hand shaking is accurately corrected in two directions vertical to an optical-axis direction by using a camera module including a hand shaking correcting device, thereby obtaining a clear and accurate image.

Further, by using a shape memory alloy wire of which constituent members are small-sized without being influenced by magnetic fields of neighboring components, the camera module can be thinned and a width of selection of a driving actuator that drives the camera module can be diversified.

Although the preferred embodiments of the present invention have been disclosed for illustrative purposes, they are for specifically explaining the present invention and thus a camera module according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A camera module, comprising:
    a lens holder including a receiving unit receiving a lens module therein;
    a driving unit joined to the lens holder to be movable in a direction vertical to an optical-axis direction;
    a housing in which the driving unit is installed to be movable in the vertical direction to the optical-axis direction and having a fixing part;
    a shape memory alloy wire part connected to the driving unit to generate driving force in the vertical direction to the optical-axis direction; and
    an elastic member applying a preload to the shape memory alloy wire part to cause initial transformation,
    wherein the lens holder includes:
        a receiving unit receiving a lens therein; and
        a top plate unit having the fixing part on a top surface and a side surface thereof and having a guide groove formed on a bottom thereof.

2. The camera module as set forth in claim 1, wherein the driving unit includes:
    a driving stage receiving the lens holder therein;
    a first ball placed between the lens holder and the driving stage to slidably drive the driving stage in the vertical direction to the optical-axis direction; and
    a second ball placed between the driving stage and the housing to slidably drive the driving stage in the other direction vertical to the optical-axis direction,
    wherein the first ball and the second ball are placed vertically to each other.

3. The camera module as set forth in claim 2, wherein the driving stage includes:
    a fixing part formed along an outer peripheral surface;
    a support bar protruding toward an image sensor from the bottom;
    an upper guide groove formed on an upper periphery to receive the first ball to be driven; and
    a lower guide groove formed on a lower periphery to receive the second ball to be driven,
    wherein the upper guide groove is formed on the same plane as one direction vertical to the optical-axis direction and the lower guide groove is formed on the same plane as the other direction vertical to the optical-axis direction.

4. The camera module as set forth in claim 1, wherein the housing further includes a guide groove formed on an upper peripheral surface, and
    the fixing part is formed on a side surface adjacent to the top where the guide groove is formed.

5. The camera module as set forth in claim 1, wherein the shape memory alloy wire part includes:
    a first shape memory alloy wire part connected to one side of the driving unit to generate driving force in the vertical direction to the optical-axis direction; and
    a second shape memory alloy wire part connected to the other side of the driving unit to generate driving force in the other direction vertical to the optical-axis direction,
    wherein the driving unit slidably moves in two directions vertical to the optical-axis direction by the driving force of the first shape memory alloy wire part and the second shape memory alloy wire part.

6. The camera module as set forth in claim 5, wherein the first shape memory alloy wire part includes:
    wire holders fixedly joined to the driving unit and positioned to be spaced apart from each other by a predetermined gap; and
    a first shape memory alloy wire of which one end is fixed to one wire holder and the other end is fixed to the other wire holder and hooked up to the lens holder.

7. The camera module as set forth in claim 5, wherein the second shape memory alloy wire part includes:
    wire holders fixedly joined to an inner surface of the housing and positioned to be spaced apart from each other by a predetermined gap; and
    a second shape memory alloy wire of which one end is fixed to one wire holder and the other end is fixed to the other wire holder and hooked up to the driving unit.

8. The camera module as set forth in claim 1, wherein the elastic member includes:
    a first elastic member of which one end is fixed to one surface of a top plate unit of the lens holder and the other end is fixed to one surface of the driving unit; and
    a second elastic member of which one end is fixed to one surface of the housing and the other end is fixed to the other surface of the driving unit.

9. The camera module as set forth in claim 8, wherein the first elastic member applies a preload to the driving unit in the vertical direction to the optical-axis direction to apply the preload to the shape memory alloy wire part.

10. The camera module as set forth in claim 8, wherein the second elastic member applies a preload to the driving unit in the other direction vertical to the optical-axis direction to apply the preload to the shape memory alloy wire part.

11. The camera module as set forth in claim 8, wherein the first elastic member and the second elastic member are configured by any one of a tensile spring or a compression spring.

12. The camera module as set forth in claim 1, further comprising:
   a case with an opening for exposing the lens module;
   an image sensor joined to the bottom of the housing and converting an image imaged by the lens into an electric signal;
   a printed circuit board that has the image sensor mounted on the top thereof and on which a lower periphery of the housing is seated;
   an infrared cut-off filter positioned on the top of the image sensor in order to filter infrared rays that are inputted into the image sensor; and
   a position sensor sensing positional changes of the lens holder and the driving unit.

13. The camera module as set forth in claim 12, wherein the position sensor is installed on an outer peripheral surface of any one of the lens holder, the driving unit, and the housing and configured by any one of a photo interrupter sensor, a photo reflector sensor, a hall effect sensor, and a magnetic sensor.

* * * * *